United States Patent
Yamada

(10) Patent No.: US 6,858,332 B2
(45) Date of Patent: Feb. 22, 2005

(54) YTTRIA-ALUMINA COMPOSITE OXIDE FILMS, LAMINATED BODIES HAVING THE SAME, A METHOD FOR PRODUCING THE SAME, AND CORROSION RESISTANT MEMBERS AND FILMS

(75) Inventor: Hirotake Yamada, Anjyo (JP)

(73) Assignee: NGK Insulators, Ltd., Nagoya (JP)

( * ) Notice: Subject to any disclaimer, the term of this patent is extended or adjusted under 35 U.S.C. 154(b) by 161 days.

(21) Appl. No.: 10/377,357

(22) Filed: Feb. 28, 2003

(65) Prior Publication Data

US 2003/0186034 A1 Oct. 2, 2003

(30) Foreign Application Priority Data

Mar. 22, 2002 (JP) .................................. P2002-080031

(51) Int. Cl.$^7$ ............................. B32B 9/04; B05D 1/02
(52) U.S. Cl. ..................... 428/697; 428/699; 428/701; 428/702; 428/336; 427/427; 427/248.1
(58) Field of Search ............................... 428/336, 697, 428/699, 701, 702; 427/427, 248.1

(56) References Cited

U.S. PATENT DOCUMENTS

| | | | |
|---|---|---|---|
| 6,641,941 B2 * | 11/2003 | Yamada et al. | 428/702 |
| 6,783,875 B2 * | 8/2004 | Yamada et al. | 428/697 |
| 2002/0177001 A1 * | 11/2002 | Harada et al. | 428/469 |
| 2003/0059653 A1 * | 3/2003 | Yamada et al. | 428/702 |
| 2004/0067392 A1 | 4/2004 | Yamada et al. | |

FOREIGN PATENT DOCUMENTS

JP    2001-110136    4/2001

OTHER PUBLICATIONS

U.S. Appl. No. 10/746,353, filed Dec. 24, 2003, Yamada et al.
U.S. Appl. No. 10/453,853, filed Jul. 15, 2003, Yamada et al.
U.S. Appl. No. 10/197,037, filed Jul. 17, 2002, Hirotake Yamada.

* cited by examiner

*Primary Examiner*—Jennifer McNeil
(74) *Attorney, Agent, or Firm*—Burr & Brown

(57) ABSTRACT

An object of the invention is to provide an yttria-alumina composite oxide film wherein peeling-off of the film from a substrate may be prevented. An intermediary layer is provided on a substrate containing at least one of alumina and yttria-alumina composite oxide as a main component. In the intermediary layer, a ratio (Y/A) of a molar ratio Y of yttria to a molar ratio A of alumina is not smaller than 0.1 and not larger than 0.9. An yttria-alumina composite oxide film is formed on the intermediary layer. A ratio (YAG (420)/M) of a peak intensity YAG (420) of a (420) plane of a garnet phase to a maximum peak intensity M of crystal phases other than the garnet phase is 2.5 or more in the yttria-alumina composite oxide film based on an X-ray diffraction measurement.

21 Claims, No Drawings

YTTRIA-ALUMINA COMPOSITE OXIDE FILMS, LAMINATED BODIES HAVING THE SAME, A METHOD FOR PRODUCING THE SAME, AND CORROSION RESISTANT MEMBERS AND FILMS

This application claims the benefit of Japanese Patent Application P-2002-80031 filed on Mar. 22, 2002, the entirety of which is incorporated by reference.

BACKGROUND OF THE INVENTION

1. Field of the Invention

The present invention relates to a laminated body having an yttria-alumina composite oxide film, an yttria-alumina composite oxide film, a corrosion-resistant member, a corrosion-resistant film, and a method of fabricating an yttria-alumina composite oxide film.

2. Related Art Statement

In a semiconductor manufacturing system in which a super-clean state is necessary, as a deposition gas, an etching gas and a cleaning gas, halogen-based corrosive gases such as chlorine-based gases and fluorine-based gases are used. For instance, in a semiconductor manufacturing system such as thermal CVD system, after the deposition, semiconductor cleaning gases made of halogen-based corrosive gases such as $ClF_3$, $NF_3$, $CF_4$, HF and HCl are used. Furthermore, in a step of the deposition, halogen-based corrosive gases such as $WF_6$, $SiH_2Cl_2$ and so on are used as gases for use in film deposition.

SUMMARY OF THE INVENTION

Accordingly, it is desired that members for use with the semiconductor manufacturing apparatus, for instance, members that are accommodated in the apparatus and an inner wall surface of a chamber are provided with a coating that is high in the corrosion-resistance to a halogen gas and its plasma and stable over a long period of time.

The assignee disclosed, in JP-A-2001-110136, that when an yttria-alumina garnet film is formed on a surface of a substrate by use of a spraying method, excellent corrosion resistance to plasma of a halogen gas can be endowed and particles can be suppressed from generating. However, even in the film, in some cases, the following problems are caused. That is, depending on spraying conditions, a film peels off the substrate after heat treatment, and thereby particles tend to be generated and the corrosion-resistance to a corrosive substance deteriorates. In this case, since this is unfavorable to products, a decrease in a product yield results.

An object of the invention is to provide an yttria-alumina composite oxide film that can suppress the peeling-off of the film from a substrate.

Furthermore, an object of the invention is to provide a corrosion-resistant member that has excellent corrosion resistance and can be used stably for a long period of time by use of the yttria-alumina composite oxide film.

The invention provides a laminated body having a substrate that contains at least one of alumina and yttria-alumina composite oxide as a main component; an yttria-alumina composite oxide film; and an intermediary film interposed between the substrate and the yttria-alumina composite oxide film. Based on an X-ray diffraction measurement of the yttria-alumina composite oxide film, a ratio (YAG (420)/M) of a peak intensity YAG (420) of a (420) plane of a garnet phase to a maximum peak intensity M of the other crystal phases is 2.5 or more. In the intermediary layer, a value (Y/A) of a ratio of a molar ratio Y of yttria to a molar ratio A of alumina is 0.1 or more and 0.9 or less.

Furthermore, the invention provides an yttria-alumina composite oxide film formed on a substrate containing at least one of alumina and yttria-alumina composite oxide as a main component. An intermediary layer is interposed between the substrate and the yttria-alumina composite oxide film. In the intermediary layer, a ratio (Y/A) of a molar ratio Y of yttria to a molar ratio A of alumina is 0.1 or more and 0.9 or less. Based on an X-ray diffraction measurement of the yttria-alumina composite oxide film, a ratio (YAG (420)/M) of a peak intensity YAG (420) of a (420) plane of garnet phase to a maximum peak intensity M of the other crystal phases is 2.5 or more.

Still furthermore, the invention provides a method of producing an yttria-alumina composite oxide film on a substrate containing at least one of alumina and yttria-alumina composite oxide as a main component. An intermediary layer is formed on the substrate. In the intermediary layer, a ratio (Y/A) of a molar ratio Y of yttria to a molar ratio A of alumina is 0.1 or more and 0.9 or less. A spray deposit is formed on the intermediary layer followed by heat treating the spray deposit to obtain the yttria-alumina composite oxide film. Based on an X-ray diffraction measurement of the yttria-alumina composite oxide film, a ratio (YAG (420)/M) of a peak intensity YAG (420) of a (420) plane of garnet phase to a maximum peak intensity M of the other crystal phases is 2.5 or more.

Furthermore, the invention provides an yttria-alumina composite oxide film obtained according to the above method.

The inventors have studied to form an yttria film on a surface of, for instance, an alumina substrate, and to form thereon a film made of yttria-alumina composite oxide according to a spraying method. In this case, depending on spraying and heat-treatment conditions, in particular when a heat-treatment condition of 1500° C. or higher, furthermore of 1550° C. or higher is adopted, in some cases, an yttria-alumina composite oxide film may partially peel off the substrate.

After having studied reasons for this, the following findings are obtained. That is, in some cases, in a spray deposit, garnet and perovskite phases may coexist, and a ratio therebetween depends on the spraying conditions. It is found that when the heat-treatment is carried out at a certain degree higher temperature, the perovskite phase in the spray deposit undergoes a phase transformation to the garnet phase, and accompanying the phase transformation a volume expansion is generated, resulting in peeling of the film off the substrate.

The inventors thought of, in the intermediary layer on the substrate, making a ratio (Y/A) of a molar ratio Y of yttria to a molar ratio A of alumina 0.1 or more and 0.9 or less. As a result, in the yttria-alumina composite oxide film, even when the phase transformation from the perovskite phase to the garnet phase is caused, the peeling-off of the yttria-alumina composite oxide film from the intermediary layer may be reduced.

In the yttria-alumina composite oxide film thus obtained, even after the heat-treatment, appreciable crack cannot be found, the peeling off the substrate is reduced, and even when coming into contact with a corrosive substance the peeling and particle generation are prevented.

These and other objects, features and advantages of the invention will be appreciated upon reading the following description of the invention when taken in conjunction with the attached drawings, with the understanding that some modifications, variations and changes of the same could be made by the skilled person in the art.

MODE FOR CARRYING OUT THE INVENTION

A material of the substrate is mainly made of at least one of alumina and yttria-alumina composite oxide. Specifically, alumina, yttria-alumina composite oxide, and a mixture of alumina and yttria-alumina composite oxide are included.

Although a material of the substrate is mainly made of at least one of alumina and yttria-alumina composite oxide, other additional components and impurities are not excluded. However, a content of the components other than the main component is preferable to be 10% by weight or less. Furthermore, in order to make the thermal expansion coefficient of yttria-alumina composite oxide (a film material) approach that of the substrate material, the substrate material is preferable to allow including a third material in alumina, yttria-alumina composite oxide, and the mixture of alumina and yttria-alumina composite oxide. As the inclusions, materials such as a spinel type compound and a zirconium compound can be cited. However, when these materials are contained much, the thermal conductivity and the material strength are lowered. Accordingly, the content is preferable to be 10% by weight or less in total, being further preferable to be in the range of 3 to 7% by weight.

As the yttria-alumina composite oxide, the followings are preferable.

$$Y_3Al_5O_{12}(YAG:3Y_2O_3.5Al_2O_3) \tag{1}$$

This contains yttria and alumina in a proportion of 3:5, and has garnet crystal structure.

$$YAlO_3(YAL:Y_2O_3.Al_2O_3) \tag{2}$$

This has perovskite crystal structure.

$$Y_4Al_2O_9(YAM:2Y_2O_3.Al_2O_3) \tag{3}$$

This belongs to monoclinic system.

The substrate may be a porous or dense material. Furthermore, a centerline averaged surface roughness Ra of a surface of the substrate, though not restricted to a particular value, may be for instance 1 $\mu$m or more, furthermore may be 1.2 $\mu$m or more. Thereby, adherence to the substrate of the film can be enhanced, resulting in suppressing particles from being generated owing to the peeling of the film.

In the invention, each of the intermediary layer and the yttria-alumina composite oxide film may exist continuously on a surface of the substrate. However, it is not necessarily required to form continuously over an entire surface of a predetermined surface of the substrate. For instance, a case where, in a surface of the substrate, the intermediary layer and the yttria-alumina composite oxide film are formed discontinuously and form a plurality of island-like layered formations may be contained. Furthermore, a case where the film is interspersed or scattered on a predetermined surface of the substrate may be contained.

In the intermediary layer, a ratio (Y/A) of a molar ratio Y of yttria to a molar ratio A of alumina is necessary to be 0.1 or more and 0.9 or less. That is, a molar ratio of alumina is necessary to be at least a little bit larger than a molar ratio of yttria.

Though material of the intermediary layer is not restricted to particular one, the followings are preferable.

(a) Yttria-alumina composite oxide: This may be the (1) $Y_3Al_5O_{12}$ alone, a mixture of (1) $Y_3Al_5O_{12}$ and (2) $YAlO_3$, a mixture of (1) $Y_3Al_5O_{12}$ and (3) $Y_4Al_2O_9$, or a mixture of (1) through (3).

(b) A mixture of alumina and the (a) yttria-alumina composite oxide.

(c) A mixture of the (a) yttria-alumina composite oxide and yttria.

(d) A mixture of the (a) yttria-alumina composite oxide, alumina and yttria.

(e) A mixture of alumina and yttria.

The yttria-alumina composite oxide film on the intermediary layer is mainly made of the garnet phase. Specifically, in an X-ray diffraction measurement, a ratio (YAG (420)/M) of a peak intensity YAG (420) of a (420) plane of the garnet phase to the maximum peak intensity M of the other crystal phases is 2.5 or more. Although the crystal phases other than the garnet phase are not restricted in the kind and may be the above-mentioned (2) and (3), the kind is typically the perovskite phase.

The YAG (420)/M is preferable to be 4.9 or more, being more preferable to be 7.4 or more. Furthermore, there is no particular upper limit of the YAG (420)/M, the yttria-alumina composite oxide film on the intermediary layer may be substantially made of the garnet phase alone.

The composition of the yttria-alumina composite oxide film on the intermediary layer, though not restricted to particular one, is necessary to be a composition ratio in which the garnet phase is dominant in the film. Specifically, a ratio (Y/A) of a molar ratio Y of yttria to a molar ratio A of alumina is preferably set in the range of 0.5 to 0.7, being more preferable to be set in the range of 0.55 to 0.65.

A preferable method of fabricating the yttria-alumina composite oxide according to the invention will be illustrated. On a surface of a substrate, one or both of a powder mixture of yttria powder and alumina powder and powder of yttria-alumina composite oxide is/are sprayed, and thereby an intermediary layer is formed. A spraying raw material of the intermediary layer is selected to attain the above composition. Subsequently, on the intermediary layer, one or both of a powder mixture of yttria powder and alumina powder and powder of yttria-alumina composite oxide is/are sprayed, and thereby a spray deposit is formed.

In a preferred embodiment, the powder mixture of yttria powder and alumina powder is sprayed, and thereby the intermediary layer and the yttria-alumina composite oxide film thereon are deposited followed by heat-treating.

At this time, a cumulative 50% particle diameter of the yttria powder is preferable to be 0.1 $\mu$m or more and 100 $\mu$m or less. Thereby, the cracks in the film can be further suppressed from occurring, and the corrosion resistance to corrosive substances such as the plasmas of the halogen-based gases can be further improved.

Furthermore, in view of further improving the adherence to the substrate of the film, a cumulative 50% particle diameter of the yttria powder is more preferable to be 0.5 $\mu$m or more, being furthermore preferable to be 3 $\mu$m or more. Furthermore, in view of further improving the adherence to the substrate of the film, a cumulative 50% particle diameter of the yttria powder is more preferable to be 80 $\mu$m or less, being furthermore preferable to be 50 $\mu$m or less, being particularly preferable to be 10 $\mu$m or less.

In a preferred embodiment, a cumulative 50% particle diameter of the alumina powder is preferable to be 0.1 $\mu$m or more and 100 $\mu$m or less. Thereby, the cracks can be further suppressed from occurring, and the corrosion resistance to corrosive substances such as the plasmas of the halogen-based gases can be further improved.

Furthermore, in view of further improving the adherence to the substrate of the film, a cumulative 50% particle diameter of the alumina powder is more preferable to be 0.3 μm or more, being furthermore preferable to be 3 μm or more. Furthermore, in view of further improving the adherence to the substrate of the film, a cumulative 50% particle diameter of the alumina powder is more preferable to be 80 μm or less, being furthermore preferable to be 50 μm or less, being particularly preferable to be 10 μm or less.

In both of the yttria powder and the alumina powder, the cumulative 50% particle diameter (D50) is a particle diameter of a primary particle when there is no secondary particle, and a particle diameter of a secondary particle when there are secondary particles.

In both of the intermediary layer and the yttria-alumina composite oxide films thereon, the powder mixture may contain powder of a third component other than the yttria powder and alumina powder. However, the third component is preferable not to be detrimental to the garnet phase and is preferable to be capable of replacing yttria or alumina in the garnet phase. As such components, the followings can be cited.

$La_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, MgO, CaO, SrO, $ZrO_2$, $CeO_2$, $SiO_2$, $Fe_2O_3$, and $B_2O_3$.

When spraying the spraying powder, preferably the above powder mixture can be sprayed as it is. Alternatively, the powder mixture may be mixed with a binder and a solvent followed by granulating by means of spray drying, and the granulated powder may be sprayed.

At the spraying, the spraying can be preferably performed at a lower pressure, and the pressure is preferable to be 100 Torr or less. Thereby, pores in the spray deposit can be further reduced, resulting in a further improvement of the corrosion resistance of the resultant film.

In a preferred embodiment, the spray deposit can be heat-treated, and thereby the peel strength to the substrate of the film can be further improved.

A temperature of the heat-treatment is preferable to be 1400° C. or higher, being more preferable to be 1500° C. or higher, being furthermore preferable to be 1550° C. or higher. It is considered that when the heat-treatment is applied at a higher temperature, a reaction in the yttria-alumina composite oxide film on the intermediary layer proceeds, and the garnet phase becomes to be easily formed. As a result the corrosion resistance of the film may be improved.

There is no upper limit of the heat-treatment temperature, a temperature where a body of the member is not degenerated may be applied. From this viewpoint, 2000° C. or lower is preferable. When the heat treatment temperature of the spray deposit becomes higher and approaches 1800° C., aluminum atoms move and diffuse in the neighborhood of a once-formed reaction layer, in some cases resulting in deteriorating the peel strength of the corrosion-resistant film on the contrary. From this viewpoint, the heat-treatment temperature is preferable to be 1800° C. or lower.

The yttria-alumina composite oxide film according to the invention is preferable to be a surface layer of a laminated body. However, another film may be further formed on the yttria-alumina composite oxide film.

The yttria-alumina composite oxide film and the laminated body according to the invention have excellent corrosion resistance, in particular high corrosion resistance to the halogen-based gas and the plasma of the halogen-based gas.

As a subject to which the corrosion-resistant member according to the invention can exhibit the corrosion resistance, there is a semiconductor fabrication device such as a thermal CVD system. In the semiconductor fabrication system like this, a semiconductor cleaning gas made of a halogen-based corrosive gas is used. The corrosion-resistant member according to the invention can maintain the corrosion resistance not only in the halogen gas plasma but also in a gaseous plasma atmosphere in which halogen gas and oxygen gas are mixed. As the halogen gas, $ClF_3$, $NF_3$, $CF_4$, $WF_6$, $Cl_2$ and $BCl_3$ can be cited.

EXAMPLES

Experiment A

The respective laminated bodies shown in Tables 1 and 2 were fabricated. Alumina powder (average particle diameter: 0.2 μm, and purity: 99.7%) was dry-pressed under a pressure of 0.2 ton/cm$^2$ to form a tabular molded body. The molded body was molded under a pressure of 2 ton/cm$^2$ by use of a clod isostatic press to form a molded body followed by sintering at 1600° C., and thereby a sintered body was obtained. The sintered body was processed into a tabular substrate having a longitudinal length of 100 mm, a transversal length of 100 mm and a thickness of 5 mm.

On the substrate, according to a plasma spraying method, an intermediary layer and a surface layer on the intermediary layer were formed. Specifically, alumina powder having an average particle diameter of 20 μm and yttria powder having an average particle diameter of 20 μm were prepared. The alumina powder and the yttria powder were mixed at molar ratios shown in columns of "intermediary layer" in Tables 1 and 2 followed by spraying on the substrate. Thicknesses of the spray deposits were shown in Tables 1 and 2. Subsequently, the alumina powder and the yttria powder were mixed at molar ratios shown in columns of "surface layer" in Tables 1 and 2 followed by spraying on the intermediary layer. Thicknesses of the spray deposits were shown in Tables 1 and 2. At the spraying, a plasma spraying system available from Sulzer Metco Co., Ltd. was used, argon was flown at a flow rate of 40 liter/min, and hydrogen was flown at a flow rate of 12 liter/min. A spraying output was 40 kW and a spraying distance was set at 120 mm.

In the next place, obtained respective laminated bodies were held at 1700° C. for 3 hours to carry out a heat-treatment. Of the obtained respective laminated bodies, in the following manner, identification of the crystal phases and measurements of the number of peels and corrosion resistance were performed. Measurements were shown in Tables 1 and 2.

(Identification of Crystal Phases)

A crystal phase was identified with an X-ray diffractometer. A ratio YAG (420)/a maximum peak intensity of the other crystalline phases was calculated. Measurement conditions were as follows.

Cu K alpha, 50 kV, 300mA, 2 θ=20 to 70 degree

Apparatus: Rotating anode X-ray diffractometer "RINT" available from Rigaku Denki Corporation.

(Peeling)

10 samples were prepared for each of examples, the peeling was observed, and the number of samples that exhibit the peeling was shown in the table. The peeling was observed according to the following ways.

(1) Visual inspection.

(2) When the peeling is not observed of a sample in the step (1), an impact was given, by use of a metal hammer, from a surface on a side opposite to a film surface to the substrate until the sample was destroyed. When the sample is broken, one in which an interface made of the film and the substrate is exposed 1 mm or more in the broken portion is defined as being peeled.

(Corrosion Resistance Test)

A sample of each of examples was set in a corrosion tester, and the test was carried out under the following conditions. Each sample is kept in $Cl_2$ gas (heater was off) for 2 hours. A flow rate of $Cl_2$ gas is 300 sccm, and that of a carrier gas (argon gas) was 100 sccm. A gas pressure is set at 0.1 Torr, and a power of RF of 800 W and a bias voltage of 310 W are applied. Each sample was measured of a corrosion depth developed in 1 hour.

(Peel Strength Test)

The peel strength was measured according to so-called Sebastian test. Specifics thereof were as follows.
1. A sample is cut into a size of 10 mm×10 mm×2 mm.
2. The cut sample is ultrasonically cleaned in acetone for 5 min.
3. An epoxy-based adhesive-provided aluminum stud pin (manufactured by Phototechnica Co., Ltd.) is prepared. An adhesion region is a circle having a diameter φ of 5.2 mm.
4. On a film formation surface side, the pin is adhered.
5. The pin thereto the sample is adhered is attached to a fixture and pulled up until the film is peeled by use of an autograph. The adhesion strength is calculated from a weight and an adhesion area when the film is peeled (adhesion strength=peel weight/adhesion area of the pin). At this time, a value of a sample that is peeled at a site of the adhesive is not treated as a measurement.

TABLE 1

| Experiment No. | Material of substrate | Intermediary layer Y2O3/A2O3 (mol/mol) | Film thickness (μm) | Surface layer Strength of 420 of YAG crystalline phase/ Maximum peak strength of the other crystalline phases | Film thickness (μm) | Peeling (Number of peeling/ Number of films) | Corrosion resistance (μm/hr) | Peel strength (MPa) |
|---|---|---|---|---|---|---|---|---|
| 1 | Alumina | 0 | 30 | 7.3 | 100~200 | 10/10 | — | — |
| 2 | Alumina | 0.1 | 30 | 7.8 | 100~200 | 0/10 | 0 | 20 |
| 3 | Alumina | 0.3 | 10 | 7.9 | 100~200 | 0/10 | 0.1 | 40 |
| 4 | Alumina | 0.3 | 20 | 7.9 | 10~200 | 0/10 | 0 | 58 |
| 5 | Alumina | 0.3 | 30 | 7.9 | 100~200 | 0/10 | 0 | 42 |
| 6 | Alumina | 0.3 | 30 | 0.8 | 100~200 | 0/10 | 2.3 | 38 |
| 7 | Alumina | 0.3 | 30 | 1.2 | 100~200 | 0/10 | 1.2 | 43 |
| 8 | Alumina | 0.3 | 30 | 2.5 | 100~200 | 0/10 | 0.4 | 44 |
| 9 | Alumina | 0.3 | 30 | 4.9 | 100~200 | 0/10 | 0.2 | 43 |
| 10 | Alumina | 0.3 | 40 | 7.9 | 100~200 | 0/10 | 0 | 54 |
| 11 | Alumina | 0.3 | 45 | 8.6 | 100~200 | 0/10 | 0.1 | 48 |
| 12 | Alumina | 0.3 | 50 | 7.9 | 100~200 | 0/10 | 0 | 43 |

TABLE 1

| Experiment No. | Material of substrate | Intermediary layer Y2O3/A2O3 (mol/mol) | Film thickness (μm) | Surface layer Strength of 420 of YAG crystalline phase/ Maximum peak strength of the other crystalline phases | Film thickness (μm) | Peeling (Number of peeling/ Number of films) | Corrosion resistance (μm/hr) | Peel strength (MPa) |
|---|---|---|---|---|---|---|---|---|
| 13 | Alumina | 0.3 | 60 | 7.9 | 100~200 | 0/10 | 0 | 35 |
| 14 | Alumina | 0.3 | 70 | 7.9 | 100~200 | 0/10 | 0 | 32 |
| 15 | Alumina | 0.5 | 30 | 7.4 | 100~200 | 0/10 | 0.1 | 28 |
| 16 | Alumina | 0.6 | 30 | 8.2 | 100~200 | 0/10 | 0 | 21 |
| 17 | Alumina | 0.7 | 30 | 7.6 | 100~200 | 1/10 | 0 | 19 |
| 18 | Alumina | 0.9 | 30 | 9.3 | 100~200 | 2/10 | 0.1 | 16 |
| 19 | Alumina | 1 | 30 | 8.4 | 100~200 | 9/10 | — | 5 |
| 20 | Alumina | 1.2 | 30 | 7.8 | 100~200 | 10/10 | — | — |
| 21 | Alumina | 3 | 30 | 5.7 | 100~200 | 10/10 | — | — |
| 22 | Alumina | 5 | 30 | 6.9 | 100~200 | 10/10 | — | — |
| 23 | Alumina | 10 | 30 | 8.8 | 100~200 | 10/10 | — | — |

In test number 1 in which the intermediary layer was made of alumina, all the samples peeled. Test numbers 2 through 12 did not exhibit the peeling. However, in test numbers 6 and 7, since a ratio of the garnet phase in the surface layer was low, accordingly, the corrosion resistance became low. Also in the test numbers 13 through 18, the peeling was not exhibited or the number of the peeling was slight, that was, the corrosion resistance of the surface layer was excellent. In test numbers 19 through 23, there was exhibited a lot of peelings. The peel strength of portions that were not peeled of samples that exhibit the peeling of more than 30% was 5 MPa or less.

Experiment B

Similarly to the experiment A, the respective laminated bodies shown in Table 3 were fabricated and evaluated. However, different from the experiment A, each of the samples was prepared with a surface layer having a thickness in the range of 400 to 1500 μm.

However, different from the experiment A, a substrate made of a mixture of alumina and yttrium-aluminum garnet (YAG) was used. Specifically, alumina powder (average particle diameter: 0.2 μm and purity: 99.7%) and yttria powder (average particle diameter: 0.6 μm and purity: 99.9%) were dry-mixed, and thereby a powder mixture was prepared. A molar ratio of alumina to yttria was set at 3 to

TABLE 3

| | | Intermediary layer | | Surface layer | | | | |
| | | | | Strength of 420 of YAG crystalline phase/ | | Peeling (Number of | | |
| Experiment No. | Material of substrate | Y2O3/Al2O3 (mol/mol) | Film thickness (μm) | Maximum peak strength of the other crystalline phases | Film thickness (μm) | peeling/ Number of films) | Corrosion resistance (μm/hr) | Peel strength (MPa) |
|---|---|---|---|---|---|---|---|---|
| 24 | Alumina | 0 | 30 | 8 | 400~1500 | 10/10 | — | — |
| 25 | Alumina | 0.1 | 30 | 7.4 | 400~1500 | 0/10 | 0.1 | 19 |
| 26 | Alumina | 0.3 | 30 | 6.2 | 400~1500 | 0/10 | 0 | 32 |
| 27 | Alumina | 0.5 | 30 | 7.5 | 400~1500 | 0/10 | 0 | 45 |
| 28 | Alumina | 0.55 | 30 | 7.9 | 400~1500 | 0/10 | 0.1 | 36 |
| 29 | Alumina | 0.6 | 30 | 8.3 | 400~1500 | 1/10 | 0.1 | 21 |
| 30 | Alumina | 0.7 | 30 | 5.8 | 400~1500 | 3/10 | 0 | 15 |
| 31 | Alumina | 0.9 | 30 | 6.4 | 400~1500 | 3/10 | 0.1 | 10 |
| 32 | Alumina | 1 | 30 | 8.3 | 400~1500 | 10/10 | — | 2 |
| 33 | Alumina | 1.2 | 30 | 7.6 | 400~1500 | 10/10 | — | — |
| 34 | Alumina | 3 | 30 | 5.9 | 400~1500 | 10/10 | — | — |
| 35 | Alumina | 5 | 30 | 6.7 | 400~1500 | 10/10 | — | — |
| 36 | Alumina | 10 | 30 | 9.5 | 400~1500 | 10/10 | — | — |

In test numbers 25 through 31, all of the samples exhibited excellent corrosion resistance. In addition, in test number 24 in which an intermediary layer that was made of alumina was employed, the number of the peeling was large. The peel strength of non-peeled portions of samples that exhibited the peeling generation of 30% or more was 2 MPa or less.

In test numbers 25 through 36, a molar ratio of yttria in the intermediary layer was gradually increased. As a result, it was found that a molar ratio of yttria to that of alumina is necessary to be 0.9 or less, and most preferable to be 0.6 or less. Thus, according to the invention, an yttrium-aluminum garnet film having such a thickness as 1500 μm can be formed.

7. The powder mixture was molded at 0.2 ton/cm² by use of a dry press to form a tabular molded body followed by cold isostatic press molding at 2 ton/cm² to form a molded body. The molded body was sintered at 1600° C., and thereby a sintered body was obtained. The sintered body was processed into a tabular substrate having a longitudinal length of 100 mm, a transversal length of 100 mm and a thickness of 5 mm.

TABLE 4

| | | Intermediary layer | | Surface layer | | | | |
| | | | | Strength of 420 of YAG crystalline phase | | Peeling (Number of | | |
| Experiment No. | Material of substrate | Y2O3/Al2O3 (mol/mol) | Film thickness (μm) | Maximum peak strength of the other crystalline phases | Film thickness (μm) | peeling/ Number of films) | Corrosion resistance (μm/hr) | Peel strength (MPa) |
|---|---|---|---|---|---|---|---|---|
| 37 | Alumina + YAG | 0 | 30 | 7.3 | 100~200 | 10/10 | — | — |
| 38 | Alumina + YAG | 0.1 | 30 | 6.2 | 100~200 | 0/10 | 0.1 | 18 |
| 39 | Alumina + YAG | 0.5 | 30 | 8.3 | 100~200 | 0/10 | 0 | 42 |
| 40 | Alumina + YAG | 0.55 | 30 | 7.1 | 100~200 | 0/10 | 0 | 51 |
| 41 | Alumina + YAG | 0.6 | 30 | 5.4 | 100~200 | 0/10 | 0.1 | 53 |
| 42 | Alumina + YAG | 0.9 | 30 | 4.7 | 100~200 | 1/10 | 0.1 | 21 |
| 43 | Alumina + YAG | 1 | 30 | 8.1 | 100~200 | 8/10 | — | 4 |
| 44 | Alumina + YAG | 1.2 | 30 | 6.3 | 100~200 | 10/10 | — | — |

Experiment C

Similarly to the experiment A, the respective laminated bodies shown in Table 4 were prepared and evaluated.

In test number 37 that yttria was not contained in the intermediary layer, the number of the peeling was large. In test numbers 38 through 42, there was no peeling or only a slight peeling, and the corrosion resistance was also excellent. In test numbers 43 and 44, the number of the peeling was large. The peel strengths of samples that exhibited the peeling of more than 30% were not measured because the peeling occurs during preparation of samples for use in the peel strength measurement.

Experiment D

Similarly to the experiment A, the respective laminated bodies shown in Table 5 were prepared and evaluated. However, different from the experiment A, a substrate made of a mixture of alumina, yttrium-aluminum garnet (YAG) and a perovskite structure oxide (YAL) of yttria and alumina was used. Specifically, alumina powder (average particle diameter: 0.2 μm and purity: 99.7%) and yttria powder (average particle diameter: 0.6 μm and purity: 99.9%) were dry-mixed, and thereby a powder mixture was prepared. A molar ratio of alumina to yttria was set at 1 to 1. The powder mixture was dry-pressed at 0.2 ton/cm$^2$ to form a tabular molded body followed by applying cold isostatic press at 2 ton/cm$^2$ to form a molded body. The molded body was sintered at 1600° C., and thereby a sintered body was obtained. The sintered body was processed into a tabular substrate having a longitudinal length of 100 mm, a transversal length of 100 mm and a thickness of 5 mm.

TABLE 5

| Experiment No. | Material of substrate | Intermediary layer | | Surface layer | | | | |
|---|---|---|---|---|---|---|---|---|
| | | Y2O3/Al 2O3 (mol/mol) | Film thickness (μm) | Strength of 420 of YAG crystalline phase/ Maximum peak strength of the other crystalline | Film thickness (μm) | Peeling (Number of peeling/ Number of films) | Corrosion resistance (μm/hr) | Peel strength (MPa) |
| 45 | Alumina + YAG + YAL | 0 | 30 | 6.3 | 100~200 | 10/10 | — | — |
| 46 | Alumina + YAG + YAL | 0.1 | 30 | 4.5 | 100~200 | 0/10 | 0 | 27 |
| 47 | Alumina + YAG + YAL | 0.5 | 30 | 6.9 | 100~200 | 0/10 | 0 | 39 |
| 48 | Alumina + YAG + YAL | 0.6 | 30 | 7.3 | 100~200 | 2/10 | 0.1 | 19 |
| 49 | Alumina + YAG + YAL | 0.9 | 30 | 7.9 | 100~200 | 3/10 | 0 | 10 |
| 50 | Alumina + YAG + YAL | 1 | 30 | 6.8 | 100~200 | 10/10 | — | — |
| 51 | Alumina + YAG + YAL | 1.2 | 30 | 5.7 | 100~200 | 10/10 | — | — |

In test number 45 that yttria was not contained in the intermediary layer, the number of the peeling was large. In test numbers 46 through 51, the ratio of yttria in the intermediary layer was altered. As a result, it is confirmed that when the molar ratio of yttria to alumina in the intermediary layer is set at 0.9 or less, more preferably at 0.6 or less, the number of the peeling can be substantially reduced, and a surface layer excellent in the corrosion resistance can be obtained. The peel strength of the portions that did not peel of samples that exhibited the peeling of more than 30% were not measured.

As described above, according to the invention, an yttria-alumina composite oxide film that is suppressed from peeling off a substrate can be provided.

The present invention has been explained referring to the preferred embodiments. However, the present invention is not limited to the illustrated embodiments which are given by way of examples only, and may be carried out in various modes without departing from the scope of the invention.

What is claimed is:

1. A laminated body comprising a substrate containing at least one of alumina and yttria-alumina composite oxide as a main component; an yttria-alumina composite oxide film; and an intermediary layer interposed between said substrate and said yttria-alumina composite oxide film:

wherein a ratio (YAG (420)/M) of a peak intensity YAG (420) of a (420) plane of a garnet phase to a maximum peak intensity M of crystal phases other than said garnet phase is 2.5 or more in said yttria-alumina composite oxide film based on an X-ray diffraction measurement; and a ratio (Y/A) of a molar ratio Y of yttria to a molar ratio A of alumina is not smaller than 0.1 and not larger than 0.9 in said intermediary layer.

2. The laminated body of claim 1, wherein said ratio (Y/A) of a molar ratio Y of yttria to a molar ratio A of alumina is 0.6 or less in said intermediary layer.

3. The laminated body of claim 1, wherein said intermediary layer has a thickness of 1 μm or more and 50 μm or less.

4. The laminated body of claim 1, wherein said yttria-alumina composite oxide film has a thickness of 50 μm or more.

5. The laminated body of claim 1, wherein said substrate contains a spinel compound, or a zirconium compound, or both of said spinel and zirconium compounds in a total amount of 10% by weight or less.

6. The laminated body of claim 1, wherein said yttria-alumina composite oxide film is formed by spraying a powder mixture of yttria powder and alumina powder to obtain a spray deposit and by heat-treating said spray deposit.

7. A corrosion-resistant member comprising said laminated body of claim 1.

8. A corrosion-resistant member of claim 7, wherein said corrosion-resistant member is to be exposed to a halogen gas or plasma of said halogen gas.

9. An yttria-alumina composite oxide film formed on a substrate containing at least one of alumina and yttria-alumina composite oxide as a main component:

wherein an intermediary layer is interposed between said substrate and said yttria-alumina composite oxide film, and a ratio (Y/A) of a molar ratio Y of yttria to a molar ratio A of alumina is not smaller than 0.1 and not larger than 0.9 in said intermediary layer; and a ratio (YAG (420)/M) of a peak intensity YAG (420) of a (420) plane of a garnet phase to a maximum peak intensity M of crystal phases other than said garnet phase is 2.5 or more in said yttria-alumina composite oxide film based on an X-ray diffraction measurement.

10. The film of claim 9, wherein said ratio (Y/A) of a molar ratio Y of yttria to a molar ratio A of alumina is 0.6 or less in said intermediary layer.

11. The film of claim 9, wherein said yttria-alumina composite oxide film has a thickness of 50 $\mu$m or more.

12. The film of claim 9, wherein said substrate contains a spinel compound, or a zirconium compound, or both of said spinel type and zirconium compounds in a total amount of 10% by weight or less.

13. The film of claim 9, wherein said yttria-alumina composite oxide film is formed by spraying a powder mixture of yttria powder and alumina powder to obtain a spray deposit and by heat-treating said spray deposit.

14. A method of fabricating an yttria-alumina composite oxide film on a substrate containing at least one of alumina and yttria-alumina composite oxide as a main component:
wherein an intermediary layer is formed on said substrate, a ratio (Y/A) of a molar ratio Y of yttria to a molar ratio A of alumina is not smaller than 0.1 and not larger than 0.9 in said intermediary layer, and said yttria-alumina composite oxide film is formed by heat-treating a spray deposit on said intermediary layer, and a ratio (YAG (420)/M) of a peak intensity YAG (420) of a (420) plane of a garnet phase to a maximum peak intensity M of crystal phases other than said garnet phase is 2.5 or more in said yttria-alumina composite oxide film based on an X-ray diffraction measurement.

15. The method of claim 14, wherein said ratio (Y/A) of a molar ratio Y of yttria to a molar ratio A of alumina is 0.6 or less in said intermediary layer.

16. The method of claim 14, wherein said intermediary layer has a thickness of 1 $\mu$m or more and 50 $\mu$m or less.

17. The method of claim 14, wherein said yttria-alumina composite oxide film has a thickness of 50 $\mu$m or more.

18. The method of claim 14, wherein said substrate contains a spinel compound, or a zirconium compound, or both of said spinel type and zirconium compounds in a total amount of 10% by weight or less.

19. The method of claim 14, wherein said spray deposit is formed by spraying a powder mixture of yttria powder and alumina powder on the intermediary layer.

20. An yttria-alumina composite oxide film being formed according to the method of claim 14.

21. A corrosion-resistant film being composed of said yttria-alumina composite oxide film of claim 20.

* * * * *